United States Patent [19]

Baudendistel

[11] Patent Number: 5,310,566
[45] Date of Patent: May 10, 1994

[54] METHOD OF ENSURING CONSTANT PRODUCT QUALITY AND SAFETY WHEN TAILBACK CONDITIONS OCCUR IN PASTEURIZERS

[75] Inventor: Gerd Baudendistel, Schwieberdingen, Fed. Rep. of Germany

[73] Assignee: Otto Tuchenhagen GmbH & Co. KG, Buchen, Fed. Rep. of Germany

[21] Appl. No.: 934,451

[22] PCT Filed: Mar. 15, 1991

[86] PCT No.: PCT/EP91/00502

§ 371 Date: Sep. 14, 1992

§ 102(e) Date: Sep. 14, 1992

[87] PCT Pub. No.: WO91/15128

PCT Pub. Date: Oct. 17, 1991

[30] Foreign Application Priority Data

Apr. 4, 1990 [DE] Fed. Rep. of Germany ....... 4010921

[51] Int. Cl.$^5$ ............................................. A23L 3/00
[52] U.S. Cl. .................................... 426/231; 426/521
[58] Field of Search ............... 426/231, 521; 99/361, 99/362, 483; 422/38, 304

[56] References Cited

U.S. PATENT DOCUMENTS

| | | | |
|---|---|---|---|
| 2,203,141 | 6/1940 | Gruetter | 99/362 |
| 4,331,629 | 5/1982 | Huling | 99/361 |
| 4,441,406 | 4/1984 | Becker et al. | 426/521 |
| 4,727,800 | 3/1988 | Richmond et al. | 99/361 |
| 4,841,457 | 6/1989 | Clyne et al. | 426/521 |

FOREIGN PATENT DOCUMENTS

0204138 12/1986 European Pat. Off. .
0239708 10/1987 European Pat. Off. .
2432667 7/1974 Fed. Rep. of Germany .
2182542 5/1987 United Kingdom .
9003806 4/1990 World Int. Prop. O. .

*Primary Examiner*—George Yeung
*Attorney, Agent, or Firm*—Lane, Aitken & McCann

[57] ABSTRACT

The description concerns a method for ensuring constant product quality and product safety when tailback conditions occur in pasteurizers and a configuration for the implementation of the method, the intention being to ensure that, in pasteurizers operated on a through-feed principle, overpasteurization and also underpasteurization in the event of a tailback are reliably prevented and pasteurization kept within very narrow tolerance limits (PE limits). For this purpose it is proposed, inter alia, that in the pasteurizer, which is operated at a constant throughfeed speed suitable to satisfy regular pasteurizing requirements, a cooling process should be performed when the tailback begins, cooling over its width of action the relevant section of the pasteurizing zone to a temperature which allows no increase, or a slight increase not exceeding the tolerance, in the number of pasteurization units (PE) applied in that section to the product up to that time, the final position and time of action of the cooling process being determined by the tailback time $t_S$. A proposed configuration for implementing the method provides for fixed spray pipes or swivel-type nozzle systems for the purpose of applying cold water to be located along the zones which are capable of being switched on and off separately in such a way that, inter alia, the progression of the cooling process is performed in sections, without interruption, in progressive sequence and as determined by the step time $\Delta t$.

20 Claims, 5 Drawing Sheets

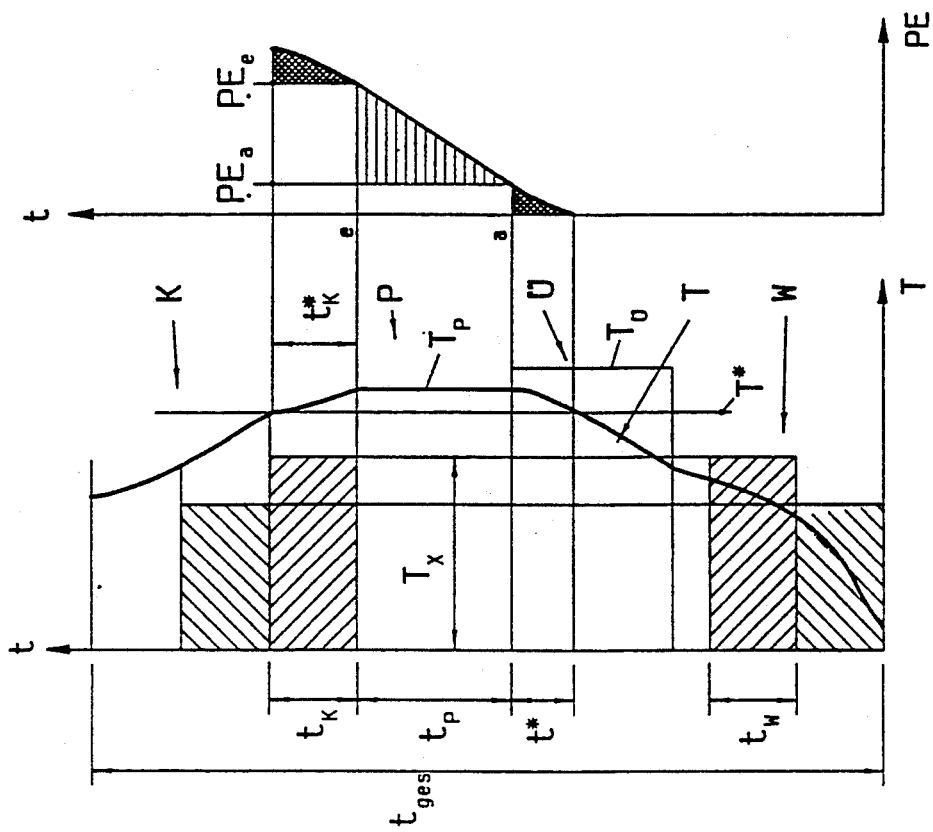
Fig. 3a
Fig. 3
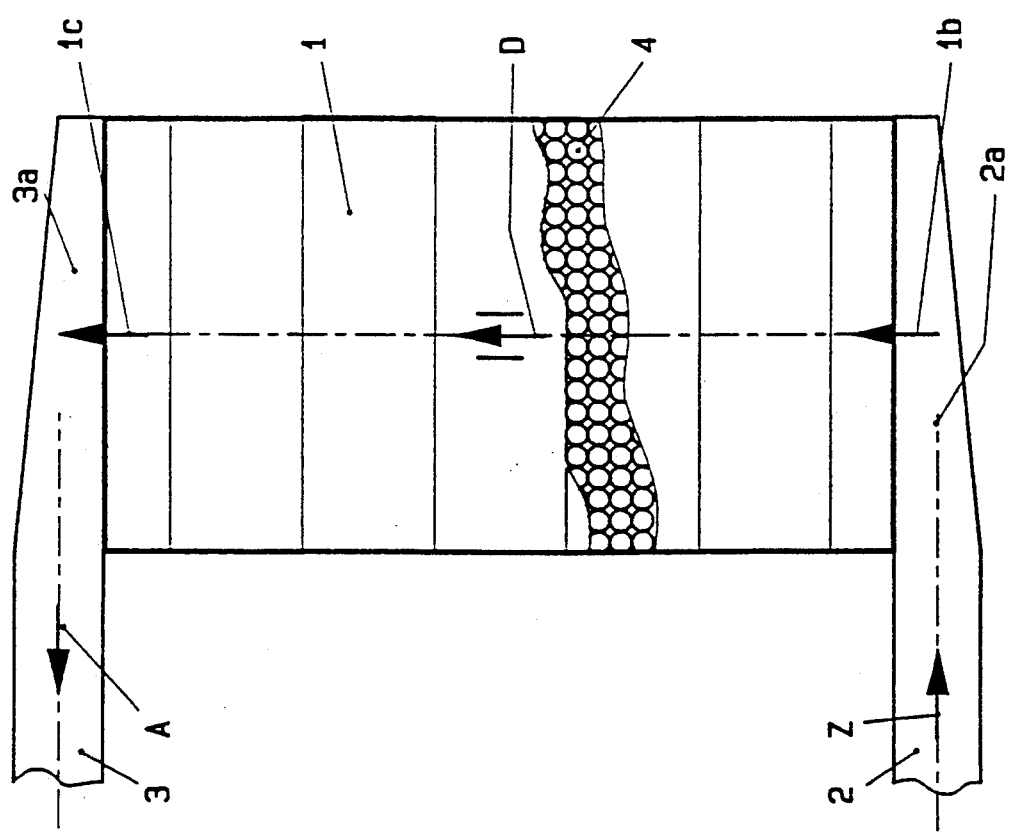
Fig. 2

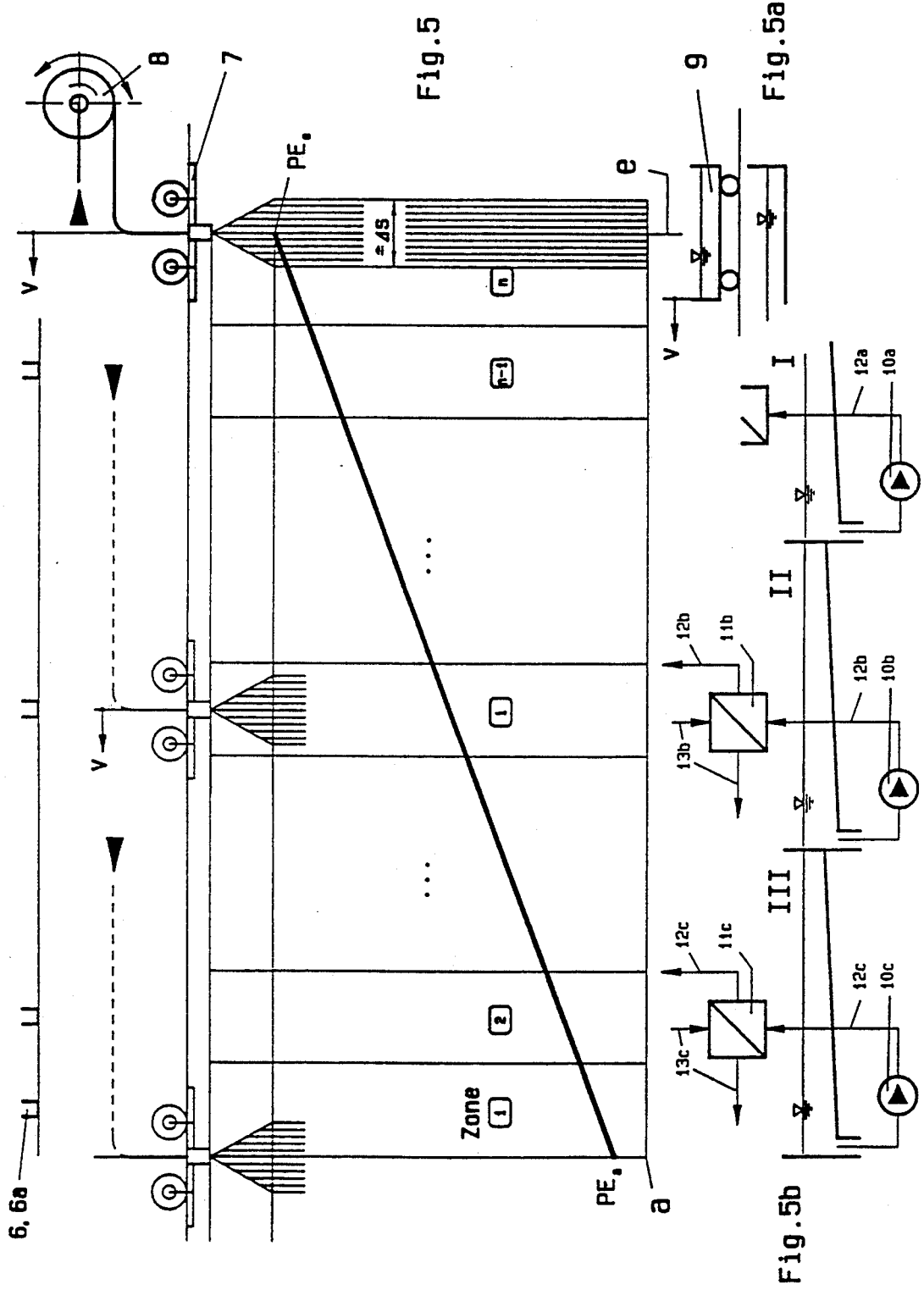

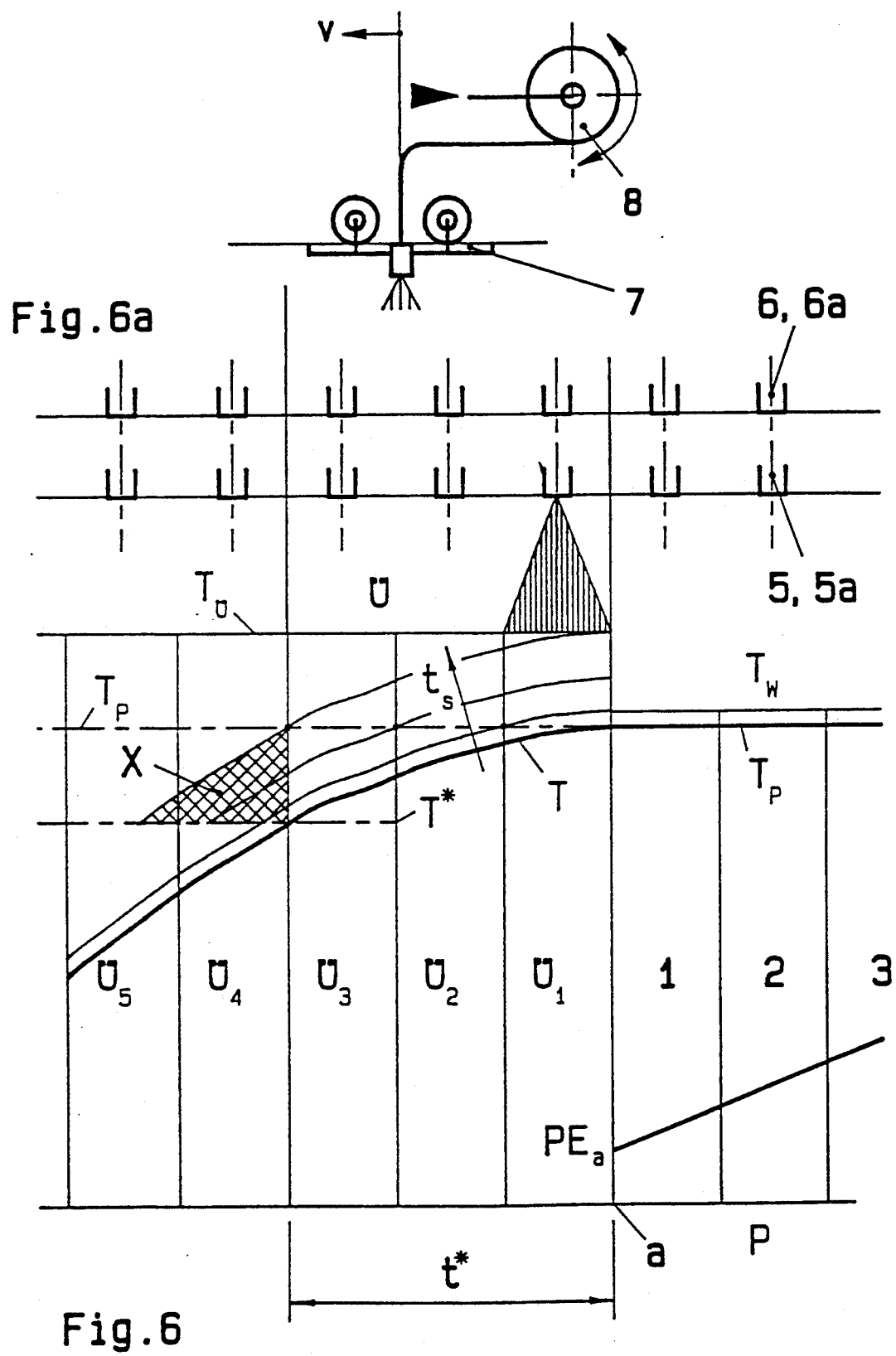

METHOD OF ENSURING CONSTANT PRODUCT QUALITY AND SAFETY WHEN TAILBACK CONDITIONS OCCUR IN PASTEURIZERS

The invention concerns a method of ensuring constant product quality and safety when tailback conditions occur in pasteurisers, the pasteuriser being operated on a throughfeed basis in such a manner that the product passes through different temperature zones, and a configuration for implementing the method.

Pasteurisers, particularly so-called tunnel pasteurisers, are integrated in equipment such as automatically operated bottling lines. Pasteurisation preserves products such as beverages, fruit and vegetables packaged in bottles, jars or tins. This procedure involves sprinkling or spraying the packages and their closures with water at different temperatures in several temperature zones. Warm-up zones are located upstream of the pasteurising zone and cool-down zones downstream of it. In order to minimize power consumption, heat recovery takes place within product-related exchange zones. Quantities of water, each at a different temperature level, are pumped back and forth in countercurrent fashion in a closed-loop circulation system between warm-up and cool-down zones allocated to each, with the result that the pasteuriser's power consumption is limited almost entirely to its insulation losses and to the amount of added heat that the packages carry with them as they emerge from the unit as compared with their initial temperature.

Obviously any stops, whether brief or extended, that hinder the passage of the packages through the pasteuriser, particularly those caused by interruptions on the line (tailbacks), can seriously upset the complex thermal balance of such a system. Such interruptions in throughfeed continuity can also result in overpasteurisation of the product that is in the pasteurising zone at that time if no special precautions are taken to guard against overpasteurisation. In their simplest form, such precautions can consist of such measures as reducing the temperature in the pasteurising zone when a stop occurs by spraying water of a lower temperature ("emergency cooling"), the effect being to terminate the pasteurising operation for the duration of the tailback. When the pasteuriser resumes operation, the line having been re-started after elimination of the tailback condition, there is a risk that the product's remaining passage through the pasteuriser may be too short to allow it to be kept hot for an adequate length of time to satisfy the product quality and safety requirements. This is described as underpasteurisation of the product to be processed.

The diagram shown in FIG. 1 is intended to illustrate briefly the problems surrounding the pasteurising operation. The effect of pasteurisation on the product depends on two influencing variables: the temperature T to which the product is exposed, and the time t during which that temperature acts on the product. The numeric equation given below (1) shows that the number of so-called "pasteurisation units" (PE) transferred to the product is related linearly to the time of action t and exponentially to temperature T:

$$PE = t \cdot 1.393^{(T-60)} \text{ where } [t] = \text{min and } [T] = °C. \quad (1)$$

"Pasteurisation unit" is the term used to denote the pasteurising effect obtained on a product such as beer by maintaining it for the duration of one minute at a temperature of 60° C.

$PE_I$ is graph showing the PE pattern of a product passing through the pasteurising zone from the point of entry into the zone (a) to the point of exit from the zone (b), assuming that its passage through the zone is uninterrupted and its speed of travel can be kept constant. If a tailback halts the passage of the product through the pasteurising zone and no precautions are taken to reduce the temperature of the product in the pasteurising zone, the result will be overpasteurisation, $\Delta PE$, which rises linearly with the tailback time $t_S$ (system of straight lines parallel to $PE_I$).

By contrast, if the temperature is reduced to a cool-down temperature, $T_K$, being a temperature which should not increase PE, a distributed temperature field characterised by the system of curves $T_o$ to $T_{n-1}$ will result within the product in the pasteurising zone when the pasteuriser is re-started. The curve $T_o$ describes the pattern of temperatures that the section at the entry end of the pasteurising zone undergoes as it passes the entire length of the zone (initial temperature $T_K$, final temperature $T_{1e}$). The sections downstream of this section each have a final temperature $T_{ie}$ when they emerge from the exit end of the pasteurising zone. The given temperature patterns show an increase in PE for each section up to the point where it emerges from the pasteurising zone; this increase in PE is described by curve $PE_{II}$. Curves $PE_I$ and $PE_{II}$ can be superposed to produce $PE_{ges}$; the distance between any point on curve $PE_{ges}$ and the required final value $PE_e$ represents the deficit, in pasteurising units (PE), of the associated pasteurising section at a point in time when, following the occurrence of a tailback, the products have been cooled to cool-down temperature $T_K$ and the pasteuriser has been re-started after elimination of the tailback condition (underpasteurisation).

A solution to the problem could be presented for cases where the tailback time, $t_S$, is greater than the pasteurising time, $t_P$. Instead of reducing the individual sections 1 to n of the pasteurising zone to cool-down temperature $T_K$ immediately on the occurrence of a tailback, as discussed above, the cooling action in such cases should be preceded by delays starting from the exit end of the pasteurising zone (e). The pattern of curve $t_V$ shows the required delay $t_V$ for each section of the pasteurising zone.

The solution suggested above only applies to cases where the tailback time $t_S$ is greater than the maximum delay time $t_{Vmax}$, since otherwise those packages which have not been cooled will be subjected to treatment for the sum of the pasteurising time $t_P$ and the tailback time $t_S$ (overpasteurisation).

Since it is not usually possible to forecast the duration of a tailback when it occurs, this proposition, which could be described as a more intelligent "modified emergency cooling process", is a theoretical solution rather than a practicable way of ensuring that product quality and product safety remain constant under all conceivable operating conditions. The uses of this solution are at best limited, and the reason for discussing it is to demonstrate the complexity of the problem in hand.

From DE 36 37 661 A1, a method and an apparatus for pasteurising foodstuffs in containers are known, these being based on the principle described above as a "modified emergency cooling process", but taking it a stage further in development with the addition of details for its technical implementation. According to the description, the known method and the apparatus purport to obviate the disadvantages caused by the occurrence of tailbacks and mispositioning of bottles and to do this by means of a variable speed which is adjusted as required for the given conditions. To correct the position of misplaced bottles in the pasteuriser for the express purpose of eliminating negative effects on power consumption, it is necessary to implement a variable throughfeed speed. However, whether a saving in power can be obtained with this method is highly questionable. Whilst it is true to say that cold water should be admitted to cool the emerging bottles if there are no bottles at the entry end, and also that extra heat should be applied to bottles entering the pasteuriser if there are none at the exit end where cooling takes place, a reduction in the pasteuriser's throughfeed speed necessitated by a bottle shortfall at the entry end would result in the minimum and maximum pasteurisation unit counts ($PE_{min}$, $PE_{max}$) being reached before the products come to the exit end of the pasteurising zone, with the result that the right amount of cooling energy is already needed at this point to bring the temperature back down to the required level.

Also, if the treatment temperature remains constant, a reduction in the throughfeed speed, by prolonging the duration of treatment, will change the final temperatures of the bottles emerging from each of the zones with the result that the pasteurisation temperature is reached at an earlier point. The even temperature distribution within the package or product that can be obtained by keeping the throughfeed speed and the treatment temperature constant is completely upset or at least severely disturbed if a variable throughfeed speed is used instead.

To prevent uncontrolled overpasteurisation occurring in pasteurisers that can operate if required with a variable throughfeed speed, the suggested expedient is that at least a part of the arrangement consisting of the pre-pasteurizing zone and the pasteurising zone should be divided into controllable elementary zones, in each of which the PE count is calculated and assigned to at least one reference container which passes through at least one part of the elementary zone, and that interruption of the pasteurising operation in the elementary zone is initiated when the PE count received by that reference container or at least one reference container amongst a multiplicity of reference containers is equivalent to a preselected maximum value $PE_{max}$ and when the PE count received by all the other reference containers, if any, is equivalent to a preselected minimum value $PE_{min}$.

The measurement and process equipment required to solve the set problem in the manner suggested are very extensive. By observing a multiplicity of reference containers and continuously calculating the pasteurisation unit counts received by each of them, overpasteurisation of the product in the event of a tailback could possibly be prevented provided that packages are cooled while they are still in the controllable elementary zone which, after calculation of the measurements received from the reference containers assigned to that zone, is shown to have reached a preselected PE range.

This known method, however, fails to give any indication as to how to approach the special problems that can occur in the event of a prolonged tailback condition in the pre-pasteurising zone which is operated at a temperature above pasteurising temperature (hereinafter referred to as the superheating zone), and what regular measures need to be taken, after re-starting the pasteuriser following elimination of the tailback condition, in the relevant sections of the superheating and pasteurising zones.

Finally, pages 16 and 17 in Issue 2/90, Year 6 of the publication entitled "Getränketechnik" (beverage technology) describe a computer-controlled PE control system designed for pasteurisers. This, however, is not based on the traditional warm-up/pasteurising zone structure but on two or more hot zones in which the temperatures are constantly modified to optimize pE reception This system requires a variable-speed main conveyor and it is also admitted that if the pasteuriser stops, in this system equivalent to pasteurising at zero speed, cooling by applying cooling water can only be avoided if pasteurising tolerances ranging between 15 PE and up to 40 PE for products such as bottled beer are acceptable. This specification should be seen in relation to a pasteurising effect with a setpoint $PE_{soll}$ of 24 to 25 which is obtained when a 0.5 liter Euro bottle of beer is pasteurised at a temperature $T_P$ of 62° C. for a duration $t_P$ of 10 min.

Even assuming that the known configuration allows the use of cooling water in the PE control system to be minimized by using heat exchangers to cool the hot products with the cold products, it still fails to eliminate the basic problem that it is impossible in the event of a tailback to keep pasteurisation within a very narrow tolerance. Tolerance limits can be regarded as narrow if they are approximately one-half to one-third of those given above.

The invention seeks to provide a method and a configuration for its implementation by means of which overpasteurisation and underpasteurisation can be reliably prevented and pasteurisation kept within very narrow tolerance limits (PE tolerances) on the occurrence of tailback conditions, irrespective of their duration, in pasteurisers of the type described initially (warm-up/pasteurisation zone structure).

Technologically, the set problem, is solved by using the characterising features set out in claim 1. Subclaims 2 to 6 describe ways in which the method can be usefully developed. A configuration for implementing the method is described by the characterising features of claim 7, while developments of that configuration form the subject matter of claims 8 to 11.

The invention concerns the further development of a pasteuriser which is operated at a constant throughfeed speed adjusted in accordance with the specified pasteurisation requirements, and it rests on the basic concept that the only way to remain within very narrow PE tolerances is to avoid cooling the product when a tailback occurs and re-starting and heating up the product when the tailback condition has been eliminated. Heating up the product when the pasteuriser has been re-started carries the risk of encountering a problem to which there is no solution, namely that even those temperatures which are below the pasteurising temperature $T_P$ have a cumulative PE-raising effect in conjunction with the required PE increase. The solution put forward in the invention consciously forgoes the use of a variable throughfeed speed for the product in view of the negative effects already discussed, and it ensures that only those pasteurisation and stop times contribute to the required PE increase which keep the product at the pasteurising temperature $T_P$. The pasteurising zone is a keep-hot zone in which only a particular configuration's heat losses to its environment need to be compensated. Consequently, the product is not overheated in the event of a tailback. The effect of the stop time due to the tailback on the product is therefore similar to pasteurisation under normal operating conditions where the product's passage through the pasteurising zone is uninhibited. On the basis of this finding, the proposed solution allows pasteurisation to continue initially on the occurrence of a tailback in all those sections of the pasteurising zone which have not yet reached the required keep-hot time (pasteurising time $t_p$).

In each of the sections, pasteurisation is terminated when the predetermined pasteurising time has elapsed by initiating a cooling process. This involves cooling the product to a temperature which will not increase the pasteurisation unit (PE) count applied to the product up to that point, or will only increase it marginally without allowing it to exceed the permitted PE tolerance range. It is proposed that the cooling process should start at the exit end of the pasteurising zone and proceed towards the entry end at the same speed as the product's throughfeed speed As the cooling process progresses, the keep-hot process in the sections to be cooled is simultaneously switched off. While the cooling process is initiated at the same time as a tailback occurs, the duration $t_S$ of each tailback determines the final point to be reached by the cooling process as well as the duration of the cooling action at that final point, the duration of the cooling action in any one case being determined by the difference between the pasteurising time $t_P$ and the tailback time $t_S$. Not until the cooling process as described above has been fully completed at the final point determined by the elimination of the tailback condition, does the keep-hot process start again in the cooled sections at the throughfeed speed, thus enabling those sections which were not reached by the cooling process to be pasteurised in the regular way.

The duration of the cooling action, i.e. the length of time for which the product requires to be cooled from the pasteurising temperature $T_P$ to a temperature $T_K$ at which no pasteurising action which would raise PE or take it outside the PE tolerance range takes place, is determined by the PE tolerance specification and also the permissible cold water temperature, since the choice of temperature has to take account of the thermal stability of the type of packages being processed To maintain the temperature levels as accurately as possible, the keep-hot process remains on in all those sections which have not yet undergone the cooling process. While the continuous progression of the cooling process allows the PE count to be kept within very narrow tolerance limits, the method according to the invention can also be enhanced to produce step-wise progression of the cooling process. The step time $\blacktriangle t$ and the related width of action $\blacktriangle S$ depend on the permissible PE tolerance range as expressed by the following equations (2) and (3):

$$\blacktriangle t = t_p \blacktriangle < PE_{Tol}/(PE_e - PE_a) \quad (2)$$

$$\blacktriangle S = v \blacktriangle t = L \blacktriangle t/t_p \quad (3)$$

where the difference $PE_e - PE_a$ is the increase in PE in the pasteurising zone, v is the throughfeed speed through that zone and L is the length of that zone.

Each of the actions proposed for the continuous mode is performed in the step-wise mode using time units quantized in the step time $\blacktriangle t$. The cooling process starts with the simple step time $\blacktriangle t$ when the tailback begins and moves towards the entry end of the pasteurising zone, the length of each step in the sequence being determined by the step time $\blacktriangle t$ and the tailback time $t_S$ quantized in the step time. The duration of action of the cooling process $t_{KD}$ is reduced step-by-step in the same way.

The step-wise mode is suited to known pasteuriser configurations in that these are provided with fixed spray pipes or swivel-type nozzle systems or sprinklers that can be switched on and off section by section over the length of the zones. The number n of zones that require to be equipped with spray systems that can be individually enabled and disabled for each section both for heat-retention and for cooling purposes is determined by equation (4):

$$n = t_p/\blacktriangle t = (PE_e - PE_a)/\blacktriangle PE_{Tol} \quad (4)$$

The proposed invention concept can also be usefully applied to the PE-raising temperature sections of the superheating zone Ü located upstream of the pasteurising zone P if, as provided for by a further development of the method, the superheating action in each of the sections is switched off when the pasteurisation temperature $T_P$ is reached, beginning at the entry end of the pasteurising zone and progressing into the superheating zone. A distinction should be made between two possible cases, one being where the tailback time $t_S$ is equal to or less than the pasteurising time $t_P$, and the other where the tailback time $t_S$ is greater than the pasteurising time $t_P$. In the latter case, the cooling process progresses, in the same way as described earlier for the pasteurising zone, into the PE-raising section of the superheating zone where it performs the necessary cooling action. In the former case ($t_S \leq t_P$), measures should be taken to ensure that those sections in which the PE count may be raised are cooled at the point where they enter the cooling process which has reached its final position in the pasteurising zone, and also that the superheating process is switched on again at throughfeed speed after a certain delay following elimination of the tailback in order to ensure that the product which is outside those sections in which the PE count may be raised is pasteurised in the regular way. The delay mentioned above is calculated by subtracting the tailback time $t_S$ from the time of passage through the entire superheating zone.

A further useful development of the method, as regards those sections of the superheating zone in which the PE count may be raised, proposes that the superheating process be switched off immediately on the occurrence of the tailback in those sections of the superheating zone which are below a temperature limit T* which will not increase the pasteurisation unit count or will only increase it marginally within the tolerance, and that the overheating process in the remaining sections be switched off when the pasteurisation temperature $T_P$ is reached, beginning at the entry end of the pasteurising zone and progressing from there into the superheating zone. The remaining process-related technical measures are the same as for the mode described earlier with the exception that, if the tailback time is shorter than the pasteurising time, the superheating process is switched on again at throughfeed speed after the tailback has been eliminated.

To ensure that power is used with the greatest possible economy, a further development of the method proposes that the quantities of cold water required for the cooling process and the quantities of warm water used in the keep-hot sections be kept separate.

A particularly advantageous development of the method in this context provides that those quantities of water used for the purpose of keeping the product hot be divided into sections and circulated in a circulation system, that the keep-hot process be switched off section by section in those sections where the cooling process is active and the quantity of water used for the purpose removed from the respective section and stored. Section-by-section removal of the keep-hot process has practically no negative effect on the pasteurising temperature $T_P$ in that section, so that that quantity of water can be removed from the circulation system, thus precluding any possibility that it could mix with the cold water applied to the same section. Since the necessary sections already exist in the pasteurising zone and are each fitted with a circulation pump to circulate the quantity of water, all that is required to implement the proposed method physically is a storage tank to store the water quantities from all the sections and a facility for switching each of the circulation pumps over to the tank.

The configuration according to the invention is based on the warm-up/pasteurisation zone structure with a pasteurising zone and a superheating zone, fitted, for the respective purposes of keeping the product hot and superheating, with fixed spray pipes or swivel-type nozzle systems or sprinklers arranged along the zones in sections which can be switched on and off. According to the invention, a spraying system is proposed which can be moved either in continuous or in step-wise mode within the pasteurising zone P and the superheating zone Ü, its width of action ▲S in the step-wise mode of progression, seen in the direction of motion, being equivalent to the step length v▲$_t$ which is determined by the permissible PE tolerance and calculated from the step time ▲t and the throughfeed speed v. A further development of the configuration proposes the application of cold water via fixed spray pipes or swivel-type nozzle systems arranged along the zones which can be switched on and off individually. This allows the cooling process to progress in a quasi-continuous manner, but it also permits the motion to proceed in sections, uninterruptedly, in sequential progression and as determined by the step time ▲t. The width of action ▲S derived from the step time ▲t (cf equations (2) and (3)) ensures that all sections of the pasteurising zone and the superheating zone respectively are covered without interruption.

To ensure that the cold water used to perform the cooling process can be kept separate as far as possible from the warm water used in the keep-hot zones of the pasteurising zone P, a further development of the configuration provides for several separate collection zones to be located within the pasteurising zone P, from each of which a circulation pump circulates the collected spray water via a heat exchanger to the associated spray pipes or swivel-type nozzle systems. If, for instance, three collection zones are provided, cold and warm water will only mix in one of the zones, while in the other two the thermal balance will remain unaffected.

A further development which also permits cold and warm water to be kept separate is characterised by a collection system, located below the cooling process in the area beneath the containers, which can be moved along the pasteurising zone synchronously with the progression of the cooling process.

The method in accordance with the invention and the configurations for its implementation are explained below giving implementation examples.

FIG. 2 is a schematic diagram showing a top view of a pasteuriser with connected feed and discharge conveyor units;

FIG. 3 is a qualitative temperature graph in which temperatures are plotted over the length of the pasteuriser;

FIG. 3a is a qualitative PE graph derived from FIG. 3 showing the pattern of values obtained from the superheating zone, the pasteurising zone and the downstream cool-down zone;

FIG. 5 shows a further development of the method according to the invention with a movable spraying apparatus;

FIG. 5a shows a movable collection system fitted to the configuration as shown in FIG. 5;

FIG. 5b shows three collection zones, fitted to the configuration as shown in FIG. 5, for collecting the spray water used in each of the sections;

Figure 1:
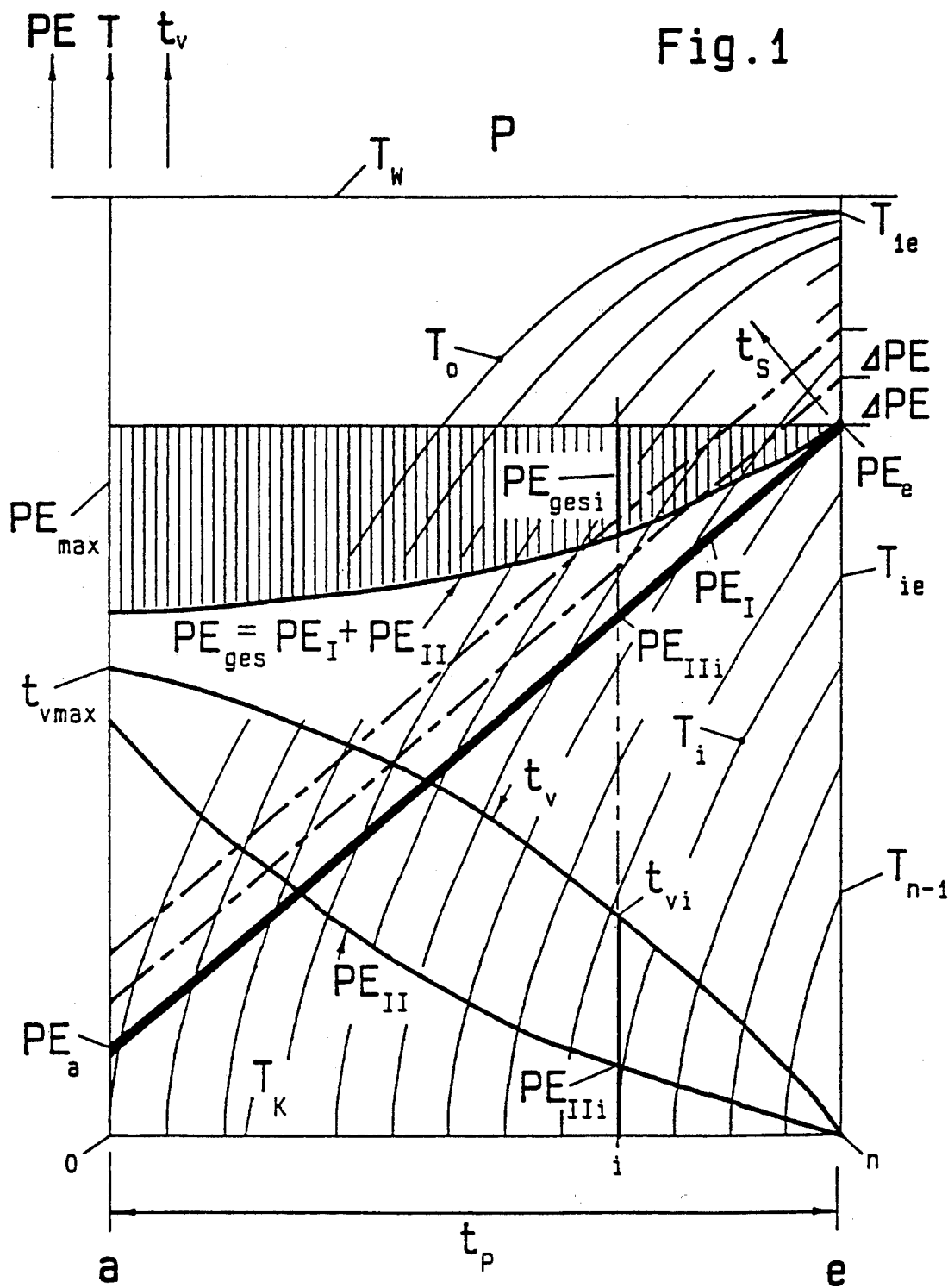
FIG. 1 is a diagram illustrating parameters associated with a pasteurising operation.

FIG. 6 is a schematic diagram showing the application of the method according to the invention to the PE-raising temperature section in the superheating zone located upstream of the pasteurising zone, and FIG. 6a shows the continuation of the fixed or movable spraying apparatus beyond the area of the pasteurising zone as far as those temperature sections of the superheating zone which no longer effect an increase in the PE count.

With the aid of FIGS. 2 to 3a, a brief explanation should be given of the structure and mode of operation of a pasteuriser of the type described initially. Containers 4, particularly bottles, jars or tins, pass through the pasteuriser 1 in throughfeed direction D. The containers are fed to the pasteuriser 1 via a feed conveyor unit 2, of which the diagram only shows the end linked to the pasteuriser 1. An infeed and distribution device 2a ensures that the containers 4 are evenly distributed across the entire width of the infeed end of the pasteurising tunnel when they enter it in infeed direction 1b. At its exit end 1c, the containers 4 are transferred via a discharge and collection device 3a to a discharge conveyor unit 3. The infeed to the pasteuriser 1 is designated Z and the discharge is designated A. If an interruption occurs at discharge A, the entire conveying system of pasteuriser 1 will come to a halt.

FIG. 3 shows a stationary temperature distribution T plotted over the length of the pasteuriser 1, the length in terms of distance being replaced by the equivalent throughfeed time t which, the throughfeed speed v being constant, is proportional to the distance. The pasteurising section P can be seen in the central area of the diagram; this has a constant pasteurising temperature $T_P$. Located upstream of this section is a warm-up zone which also includes the superheating zone Ü immediately contiguous with pasteurising zone P, and a cool-down zone, K, is located downstream. The duration of the pasteurising process is designated $t_P$, and the total throughfeed time is designated $t_{ges}$.

The hatched areas in the warm-up zone W and the cool-down zone K are intended to indicate where heat is recovered in the product-related exchange zones. For instance, in the cool-down zone K, water at temperature $T_X$ is used to produce a cooling effect for a time $t_K$ and then the heat withdrawn from the containers 4, represented by the hatched rectangle with the dimensions $T_X$ and $t_K$, is used to heat the containers 4 in the warm-up zone W. This amount of heat is now represented by the hatched rectangle with the dimensions $T_X$ and $t_W$. There are several other product-related exchange zones that operate on the same heat-exchanger principle as this example, and heat is recovered in these in the same way. In the superheating zone Ü a temperature $T_Ü$ is employed which lies marginally above the pasteurising temperature $T_P$.

time scaled to step time: $t_s/\Delta t$). The boundaries $R_o$ to $R_n$ correspond to throughfeed times t, the time $t_n$ at the exit end of the pasteurising zone being equivalent to the pasteurising time $t_p$.

Three tailbacks of different length will now be discussed with reference to the table shown below, which by relating the tailback time scaled to the step time $\Delta t$ to the individual sub-zones 1 to n, documents the method according to the invention in a different form. To simplify the calculation, the step time $\Delta t$ is assumed in this case to be one minute, and the method will be examined for tailback times of one minute, i=8 minutes and 12 minutes respectively. The pasteurisation time $t_P = t_n$ is assumed to be 13 minutes.

| Tailback time | ZONE | | | | | | | | | | | | | Cooling switched on after tailback starts | Cooling time after tailback elimination |
| $t_s/t$ | 1 | 2 | 3 | 4 | 5 | 6 | 7 | 8 | 9 | 10 | 11 | 12 | 13 | $t_{KZ}/t$ | $t_{KD}/t$ |
|---|---|---|---|---|---|---|---|---|---|---|---|---|---|---|---|
| 1 | H | H | H | H | H | H | H | H | H | H | H | H | K | 1 | 12 |
| 2 | H | H | H | H | H | H | H | H | H | H | H | K | — | 2 | 11 |
| 3 | H | H | H | H | H | H | H | H | H | H | K | — | — | 3 | 10 |
| 4 | H | H | H | H | H | H | H | H | H | K | — | — | — | 4 | 9 |
| 5 | H | H | H | H | H | H | H | H | K | — | — | — | — | 5 | 8 |
| 6 | H | H | H | H | H | H | H | K | — | — | — | — | — | 6 | 7 |
| 7 | H | H | H | H | H | H | K | — | — | — | — | — | — | 7 | 6 |
| 8 = i | H | H | H | H | H | K | — | — | — | — | — | — | — | 8 | 5 |
| 9 | H | H | H | H | K | — | — | — | — | — | — | — | — | 9 | 4 |
| 10 | H | H | H | K | — | — | — | — | — | — | — | — | — | 10 | 3 |
| 11 | H | H | K | — | — | — | — | — | — | — | — | — | — | 11 | 2 |
| 12 | H | K | — | — | — | — | — | — | — | — | — | — | — | 12 | 1 |
| 13 | AK | — | — | — | — | — | — | — | — | — | — | — | — | 13 | 0 |

FIG. 3a shows the qualitative increase in the pasteurising unit (PE) count in relation to the throughfeed time t or throughfeed distance. The pasteurising zone P is assigned initial and final values, $PE_a$ and $PE_e$ respectively, the increase between these two limits being linear as given by equation (1). It can also be seen that there are PE-raising temperature sections above a relevant temperature limit T* in the area of the superheating zone Ü and the cool-down zone K. The PE increase in these areas is relatively small, but it is not usually negligible in view of the very narrow PE tolerance limits that are necessary to ensure constant product quality and product safety.

Figure 4:
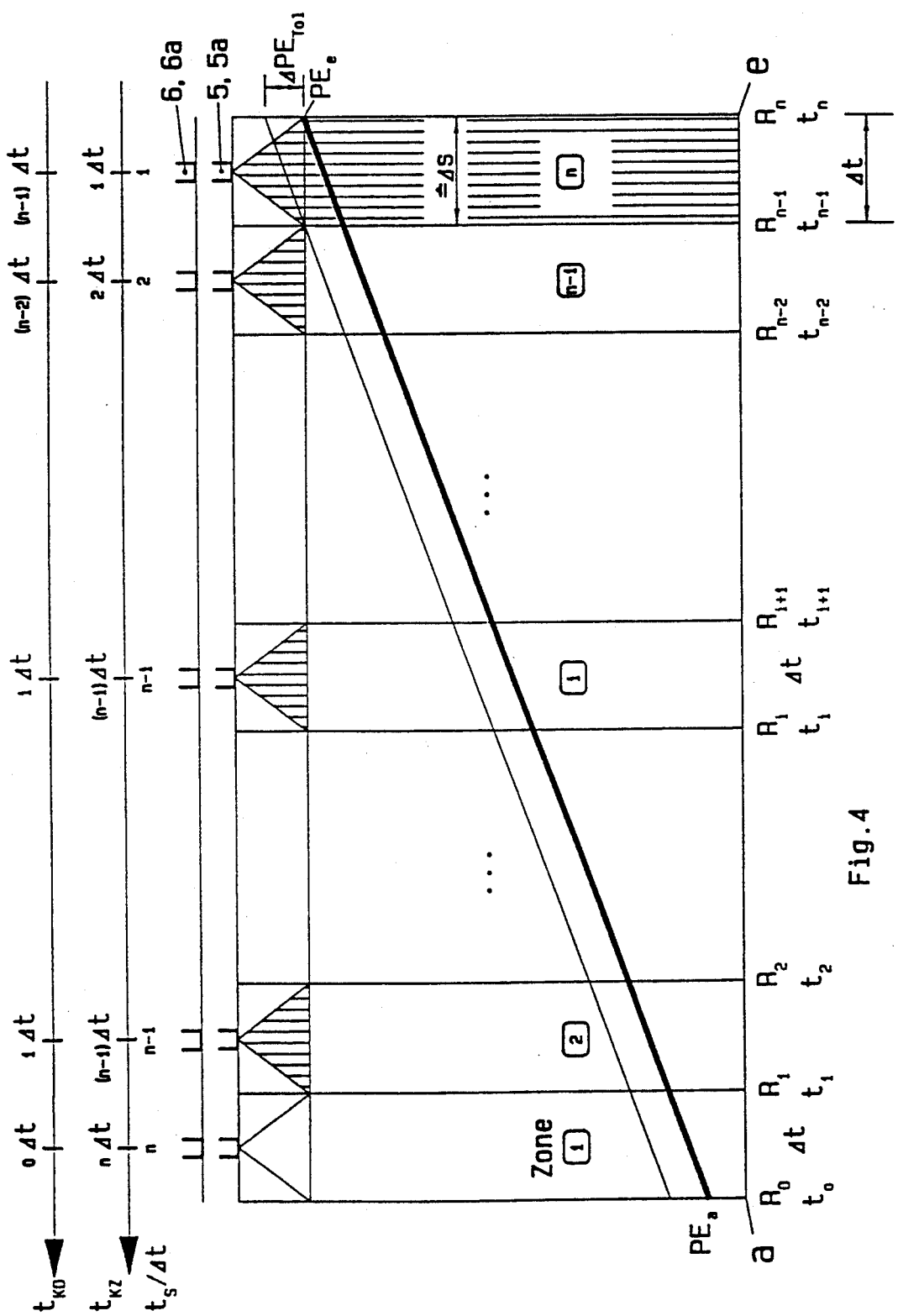
FIG. 4 is a schematic diagram showing the method according to the invention with the cooling process progressing in step-wise mode within the pasteurising zone.

FIG. 4 is a schematic diagram showing the method according to the invention implemented in step-wise mode. Between points a and e lies the pasteurising zone P of undefined length L, in which according to equation (1) the pasteurising unit count rises linearly from the initial value $PE_a$ to the final value $PE_e$.

Based on a given permissible PE tolerance $\Delta PE_{Tol}$, the resulting step time is $\Delta t$, and from this the width of action of the cooling process, $\Delta S$, is derived. The pasteurising zone is thus divided in accordance with equation (4) into 1 to n sub-zones of equal length, the boundaries of which are designated $R_o$ to $R_n$. Each of the sub-zones 1 to n is fitted with centrally located fixed spray pipes 5 or swivel-type nozzle systems 5a for the distribution of cold water, and with similarly located fixed spray pipes 6 or swivel-type nozzle systems 6a for the distribution of hot water. The upper part of the diagram shows two time graphs, the graph designated $t_{KZ}$ giving the on time for the cooling process in each of zones 1 to n after the start of the tailback, and the graph designated $t_{KD}$ giving the duration of cooling in each of zones 1 to n after the tailback has been eliminated. The values in the time graphs are each given as an integral multiple of the step time $\Delta t$. The time $t_{KZ}$ also denotes the tailback time $t_s$ (tailback Tailback time of 1 min: At the start of the tailback, the cooling is switched on with $t_{KZ}=1$ min in zone n=13. To maintain the temperatures as accurately as possible, zones 1 to 12 are kept at the pasteurising temperature $T_P$ by applying hot water.

When the tailback has been eliminated, the cooling time in zone n=13 is $t_{KD}=12$ min to ensure that the product from zone 2, for instance, will still have time to be cooled when it passes through zone n=13. Zone 1, which had already been pasteurised for an average of 1 minute when the tailback occurred, is the only one no longer to undergo cooling, since the throughfeed time from zone 1 to zone 13 is 12 min. By the proposed method, each zone receives, on average, the same keephot time at the pasteurising temperature $T_P$.

A tailback time of i=8 min is taken as an example to demonstrate the step-wise mode in greater detail. The cooling action begins again after a step time of one minute in zone n=13. In this section the product is cooled to cool-down temperature $T_K$, a temperature at which the PE count is no longer increased or only marginally so that it remains within the permissible tolerance range. The length of the cooling process depends on how low the cold water temperature is allowed to be, and also on the specified PE tolerance limits. Whatever the case, the cooling is switched over to zone 12 after a further step time of one minute. If the tailback time is i=8 min, the cooling process will progress upstream as far as zone 6 ($t_{KZ}=8$ min), so that $t_{KD}=5$ min cooling time still remains after the tailback has been eliminated. For the duration of the entire procedure described above, zones 1 to 5 are kept at the pasteurising temperature $T_P$.

If the length of the tailback is 12 min, the cooling process will reach its final position in zone 2. The cooling in this zone is switched on at a point in time $t_{KZ}=12$ min after the tailback begins. After the tailback has been eliminated, the duration of cooling in this zone is $t_{KD}=1$ min.

If, for instance, the duration of the tailback is 13 min, the cooling process will progress upstream as far as zone 1 in the mode discussed above. The table shows that the duration of cooling after tailback elimination is $t_{KD}=0$ min, which means that the cooling process only has to reduce the product's temperature to the cool-down temperature $T_K$.

As soon as the cooling process is terminated on reaching its final position after the time of action $t_{KD}$ has elapsed, the keep-hot process is switched on again at throughfeed speed v in the cooled sections.

The narrower the specified PE tolerance $\Delta PE_{Tol}$, the larger according to equation (4) is the number of sub-zones, n. At their transition boundaries, this results in a continuously progressing motion of the cooling process, its width of action $\Delta S$ only depending on the cooling requirements specific to the package (4) being cooled. These relationships are illustrated in the form of a schematic diagram in FIG. 5. A spraying system 7 is located movably within the pasteurising zone P. It is supplied, as an example, by a flexible cold water feed system 8 which in the proposed solution takes the form of a hose drum. 6 and 6a designate fixed spray pipes and swivel-type nozzle systems respectively for the purpose of keeping the product hot. When the tailback begins, the cooling process is switched on immediately; it moves at a speed equivalent to the throughfeed speed v. The keep-hot process is switched off as the cooling process progresses, the final position of the cooling process being determined by the tailback time $t_S$. The time of action $t_{KD}$ of the cooling process in the continuous mode is determined by equation (5):

$$t_{KD}=t_P-t_S; \text{ for } t_S \leq t_P \quad (5)$$

The movable spray system 7 can, of course, also be moved forward with a step-wise motion, in which case the width of action $\Delta S$ of the cooling process must be equivalent to the respective step length $v\Delta t$ which is determined by the step time $\Delta t$ and the throughfeed speed v. If the keep-hot process can only be switched on and off section by section, care must be taken when operating the movable spray system 7 in the continuous mode to ensure that the warm water and cold water areas do not overlap unnecessarily.

FIG. 5a shows a collection system 9 located below the cooling process in the area beneath the containers 4, which is movable along the pasteurising zone synchronously with the progression of the cooling process. This arrangement allows the quantities of cold water applied in the course of the cooling process to be kept separate from those quantities of water produced in the keep-hot area.

FIG. 5b shows a more simply constructed configuration for the purpose of handling cold and warm water quantities separately. The pasteurising zone P is assigned several separate collection zones I, II and III, from each of which the collected spray water is circulated by circulation pumps 10a, 10b and 10c respectively, via heat exchangers 11a, 11b and 11c respectively, and passed to the associated spray pipes 6 or swivel-type nozzle systems 6a via associated feed lines 12a, 12b and 12c respectively. The feed lines for the heating medium circulation system are designated 13a, 13b and 13c respectively.

Based on the configuration as shown in FIG. 5b, it is proposed that power could be used even more economically by removing those quantities of water used for the purpose of keeping the product hot from the circulation system sections allocated to collection zones I, II and III by means of the respective switchable circulation pumps 10a, 10b and 10c respectively, and transferring them to a storage tank, not detailed in the diagram, which has sufficient capacity to accommodate the quantities of water from all the sections.

In describing FIG. 3a, it has been indicated that in certain circumstances the superheating zone Ü could contain PE-raising temperature areas above a limit temperature T*, and that account should be taken of these. FIG. 6 is taken as a basis for examining this point in greater depth. On the right-hand side of this schematic diagram, the pasteurising zone P can be seen with zones 1, 2 and 3. Linked to the left-hand side of Zone 1 is the superheating zone with a superheating temperature $T_Ü$ which exceeds the water temperature $T_W$ in the pasteurising zone P by a certain value. T designates the temperature pattern described by the product as it passes through the pasteuriser in the regular manner. The straight line T* marks the temperature limit above which a PE-raising temperature is assumed to lie. The throughfeed time t* for the PE-raising temperature areas is obtained from the point of intersection of the temperature limit T* and the product temperature T. In the superheating zone these are designated $Ü_1$, $Ü_2$ and $Ü_3$ respectively. Zones $Ü_4$ and $Ü_5$ are outside the PE-raising temperature area.

When a tailback occurs, zones $Ü_1$ to $Ü_5$ will now heat up as shown by graphs $T(t_S)$ due to the effect of the superheating temperature $T_Ü$, as compared with the stationary temperature distribution T which is obtained in the course of an uninterrupted passage (system of curves plotted against the tailback length $t_S$). A first method according to the invention proposes that when the pasteurising temperature $T_P$ is reached in the superheating zone, the superheating process in each of the sections should be switched off, beginning at the entry end of the pasteurising zone $Ü_1$ and progressing into the superheating zone (from $Ü_1$ via $Ü_2$ to $Ü_3$). These zones will now dwell at the pasteurising temperature $T_P$ and their PE count will therefore be raised in the course of the tailback time $t_S$. Two possible cases should be distinguished, one being that the tailback time $t_S$ is equal to or less than the pasteurising time $t_P$, and the other being that the tailback time $t_S$ is greater than the pasteurising time $t_P$. In the latter of the two cases, the method according to the invention is also applied to the superheating zone in such a way that those areas $Ü_1$, $Ü_2$ and $Ü_3$ in which the PE count may be raised are cooled by the cooling process as it progresses from the pasteurising zone P into the superheating zone Ü. The superheating zones are switched on in a mode analogous to that used to switch on the keep-hot process in the pasteurising zone, this being done by allowing a delay, calculated by subtracting the tailback time $t_S$ from the time of passage through the entire length of the superheating zone, to elapse after elimination of the tailback.

In the first case ($t_S \leq t_P$), the PE-raising sections of the superheating zone are cooled at the point where they enter the cooling process which has reached its final position in the pasteurising zone P, and the superheating process is switched on again at throughfeed speed in zones $Ü_3$ to $Ü_1$ after elimination of the tailback, as described above.

The area designated X in sections $\ddot{U}_4$ and $\ddot{U}_5$ is intended to demonstrate that the temperature increase above the temperature limit T* which occurs here in the case of a tailback results in an increase in PE count which can only be neglected if it is within the acceptable PE tolerance. It can also be seen that the boundary of the PE-raising area is a moving one which advances towards the entry end of the superheating zone Ü as the duration of the tailback increases.

The method described above is applied to all the sub-sections of the superheating zone and makes no distinction at all between PE-raising areas and areas which do not contribute to the increase in PE count. If the duration of the tailback time $t_S$ is long enough, all sub-sections of the superheating zone will be heated to pasteurising temperature $T_P$, with the result that the entire zone becomes a pasteurising zone.

In contrast to the first method, a second method that concerns the treatment of the product in the superheating zone provides that the superheating process in sections which are below a temperature limit T* at which the pasteurisation unit count in the product is either not raised at all or only marginally within the tolerance should be switched off immediately on the occurrence of the tailback. This measure ensures that no further increase in PE count will take place in connection with the area X discussed previously. The area of the superheating zone which is kept hot, namely sections $\ddot{U}_1$ to $\ddot{U}_3$ in the configuration example, is initially treated in the same way as described for the first of the two methods. However, when the tailback has been eliminated, the superheating process is immediately switched on again at throughfeed speed.

FIG. 6a shows that in addition to the fixed spray pipes 6 or swivel-type nozzle systems 6a which are used for the purpose of superheating, either fixed spray pipes 5 or swivel-type nozzle systems 5a, capable of being separately switched on and off, have to be provided along the zone for the purpose of distributing cold water, or alternatively the movable spraying system 7 should be employed.

I claim:

1. A method of ensuring constant product quality and safety when tailbacks occur in a pasteuriser, the pasteuriser being operated on a throughfeed basis in such a manner that the product passes from a pasteuriser inlet, through different temperature zones including a superheating zone and a pasteurising zone divided at least in part into controllable sub-zones, to a pasteuriser outlet, a keep-hot process being employed in the pasteurising zone to pasteurise the product, comprising:
    moving the product through said pasteuriser, from the pasteuriser inlet to the pasteuriser outlet, at a constant throughfeed speed at which, in the absence of tailbacks, the product is pasteurized,
    on the occurrence of a tailback, cooling a section of the pasteurising zone to a temperature which avoids an increase in the number of pasteurisation units applied in that section to the product up to that time to a level above a predetermined acceptable tolerance level, a pasteurising unit being defined as the pasteurising effect obtained by maintaining a product of 60° C. for 1 minute,
    beginning the cooling at an exit end of the pasteurising zone and extending the cooling process towards an entry end of the pasteurising zone at a speed equal in magnitude to the throughfeed speed, as the cooling process progresses from the entry end of the pasteurising zone to the outlet end, switching off the keep-hot process,
    at the end of the tailback time $t_S$, determining the time of duration $t_{KD}$ of the cooling process at whatever final position the cooling process has then reached by the difference between the pasteurising time $t_P$ and the tailback time $t_S$, and
    subsequently switching on the keep-hot process again at the throughfeed speed in the section which has been cooled.

2. The method according to claim 1, wherein
    in dependence on a predetermined acceptable pasteurisation unit tolerance level $PE_{Tol}$ and the change in the pasteurisation unit count desired in the pasteurising zone at the end of the pasteurising time $t_P$, a step time $\Delta t$ is calculated,
    the cooling process is switched on at the step time $\Delta t$ after the onset of the tailback,
    a width of action $\Delta S$ of the cooling process, in the throughfeed direction, is determined by the length L of the pasteurising zone times the ratio of the step time $\Delta t$ to the pasteurising time $t_p$,
    the cooling process moves through the pasteurising zone in a progressive sequence at integral increments of the step time $\Delta t$ and as determined by the tailback time $t_S$ quantized in the step time, and
    the duration of the action $t_{KD}$ of the cooling process is reduced step-by-step in the same way.

3. The method according to claim 1, wherein
    the superheating zone is upstream of the pasteurising zone,
    a superheating process takes place in the superheating zone by which the pasteurising temperature $T_p$ is reached in the superheating zone,
    in the case of a tailback, when the pasteurising temperature $T_p$ is reached in the superheating zone, the superheating process is switched off, beginning at the entry end of the pasteurising zone and progressing into the superheating zone,
    those sections of the superheating zone which can effect an increase in the number of pasteurisation units are cooled on entering the cooling process which has reached its final position in the pasteurizing zone, if the tailback time is equal to or less than the pasteurising time, and cooled by the cooling process as it progresses from the pasteurising zone into the superheating zone, if the tailback time is greater than the pasteurising time, and the treatment of those sections is continued analogously to the method used in the pasteurising zone, and
    the superheating process, if the tailback time is equal to or less than the pasteurised time, is switched on again at the throughfeed speed at the end of a delay following elimination of the tailback, such delay being calculated by subtracting the tailback time $t_S$ from the throughfeed time through the entire superheating zone.

4. The method according to claim 1, wherein
    the superheating process in sections of the superheating zone which are below a temperature limit T* which effects either no increase, or a slight increase not exceeding the tolerance, in the pasteurisation unit count received by the product, is switched off immediately at the onset of the tailback,
    the superheating process in the remaining sections of the superheating zone is switched off on reaching the pasteurising temperature $T_p$, beginning at the entry end of the pasteurising zone and progressing into the superheating zone, those sections which can increase the pasteurisation unit count are either, if the tailback time is equal to or less than the pasteurising time, cooled on entering the cooling process which has reached its final position in the pasteurising zone, or, if the tailback process as it progresses from the pasteurising zone into the superheating zone and the treatment of those sections continued analogously to the method used in the pasteurising zone, and the superheating process, if the tailback time is equal to or less than the pasteurising time, is switched on again at the throughfeed speed following elimination of the tailback.

5. The method according to claim 1, wherein the quantities of cold water applied by the cooling process are kept separate from the quantities of warm water applied in the keep-hot areas.

6. The method according to claim 5, wherein those quantities of water used for the purpose of keeping the product hot are handled separately for each section and are circulated, and the keep-hot process is switched off section by section in those sections in which the cooling process is performed and the quantity of water used for that purpose removed from the respective section and stored.

7. The method according to claim 1, further comprising providing heat retention in the pasteurising zone and superheating in the superheating zone by switching on and off the discharge of heated fluid in sections along the zones.

8. The method according to claim 7, wherein the heated fluid is discharged through fixed spray pipes.

9. The method according to claim 7, wherein the heated fluid is discharged through swivel-type nozzles.

10. The method according to claim 7, wherein the switching-on of the discharge of heated fluid and the switching-off of the discharge of the heated fluid progress continuously from section to section.

11. The method according to claim 7, wherein the switching on and off of the discharge of heated fluid progresses in discrete steps from section to section, and wherein the width of action of the discharge in each step in the direction of progression is determined by the step time $\Delta t$ and the throughfeed speed $v$.

12. The method according to claim 1, wherein the cooling comprises switching on and off the discharge of cold water in sections along the zones.

13. The method according to claim 12, wherein the cold water is discharged through fixed spray pipes.

14. The method according to claim 12, wherein the cold water is discharged through swivel-type nozzles.

15. The method according to claim 12, wherein the switching-on of the discharge of cold water and the switching-off of the discharge of the cold water progress continuously from section to section.

16. The method according to claim 12, wherein the switching on and off of the discharge of cold water progresses in discrete steps from section to section, and wherein the width of action of the discharge in each step in the direction of progression is determined by the step time $\Delta t$ and the throughfeed speed $v$.

17. The method according to claim 7, wherein the discharged heated fluid is collected form the pasteurising zone at several discrete collection zones, from each of which the collected fluid is circulated by a circulation pump, and returned to the associated discharge device through a heat exchanger.

18. The method according to claim 12, wherein the discharged cold water is collected form the pasteurising zone at several discrete collection zones, from each of which the collected cold water is circulated by a circulation pump, and returned to the associated discharge device through a heat exchanger.

19. The method according to claim 7, wherein the pasteurising zone defines a plurality of separate circulation system sections, and the keep-hot process comprises, for each of said circulation system sections, withdrawing a quantity of discharged fluid through a circulation pump, and feeding the withdrawn fluid to a storage tank having sufficient capacity to accommodate the discharged fluid quantities from all of the sections.

20. The method according to claim 12, further comprising positioning a water collection system at the bottom of a zone in which the cooling is taking place, and moving the collection system along the pasteurising zone synchronously with the progression of the cooling process.

* * * * *

UNITED STATES PATENT AND TRADEMARK OFFICE
CERTIFICATE OF CORRECTION

PATENT NO. : 5,310,566
DATED : May 10, 1994
INVENTOR(S) : Gerd Baudendistel It is certified that error appears in the above-identified patent and that said Letters Patent is hereby corrected as shown below:

Column 4, line 12, "pE" should be --PE--;

line 13, after "reception", --.-- should be inserted; and line 41, after "problem", "," should be deleted.

Column 5, line 22, after "speed", --.-- should be inserted; and line 46, after "processed", --.-- should be inserted.

Column 6, line 35, "$\leq$" should be --$\leq$--.

Column 9, line 46, after "mode", --.-- should be inserted.

Column 11, line 35, "$\leq$" should be --$\leq$--

Column 12, line 62, "$\leq$" should be --$\leq$--.

Claim 1, line 21, "of" should be --at--.

Claim 4, line 17, after "tailback", --time is greater than the pasteurising time, cooled by the cooling-- should

UNITED STATES PATENT AND TRADEMARK OFFICE
CERTIFICATE OF CORRECTION

PATENT NO. : 5,310,566
DATED : May 10, 1994
INVENTOR(S) : Gerd Baudendistel It is certified that error appears in the above-identified patent and that said Letters Patent is hereby corrected as shown below:

be inserted.

Claim 17, line 2, "form" should be --from--.

Claim 18, line 2, "form" should be --from--.

Signed and Sealed this

Twenty-seventh Day of September, 1994

Attest:

BRUCE LEHMAN

Attesting Officer     *Commissioner of Patents and Trademarks*